April 21, 1931.  A. G. BARRETT ET AL  1,801,712

MEANS FOR ELIMINATING BRAKE DRUM SQUEAKING

Filed Sept. 28, 1928

Inventor:
Alfred G. Barrett and
Hubert H. Burton
by Barthel & Barthel
Attys.

Patented Apr. 21, 1931

1,801,712

UNITED STATES PATENT OFFICE

ALFRED GEORGE BARRETT AND HUBERT HENRY BURTON, OF LEICESTER, ENGLAND

MEANS FOR ELIMINATING BRAKE-DRUM SQUEAKING

Application filed September 28, 1928, Serial No. 309,018, and in Great Britain October 1, 1927.

This invention has for its object the deadening or eliminating of the squeaking or screeching noises which in many instances follow the application of the brakes on motor vehicles. It is well known that in certain motor vehicles a disagreeable squeak or noise is emitted on the application of the brakes owing to the brake drums employed being thin and resonant and consequential vibrations being set up in the drum. With the object of preventing such noise it has heretofore been proposed to shrink a cast iron or mild steel ring on the drum, or to fit same with an elastic or resilient band which may be provided with metal.

According to the present invention, there is provided around the outer periphery of a brake drum of a motor vehicle, a rope of rubber or other suitable resilient material wherein there is disposed a wire core which maintains said rope in tension on said brake drum, in order to effectively absorb the vibrations set up in the drum—consequent on the application of the vehicle brakes—and so minimize or eliminate noise, and said rope or band having, preferably, a flat bearing surface of substantial width.

The ends of said wire core may be joined together in any convenient manner, and the ends of the rope may be permanently joined or secured together by vulcanization, or with the aid of a suitable adhesive; but it may be preferred to rely solely on a face or butt-to-butt joint of the rope ends, such joint being maintained by the natural or inherent elasticity or resilience of the rubber under compression.

We will further describe our invention with the aid of the accompanying sheet of explanatory drawings, in which:—

Figure 1:
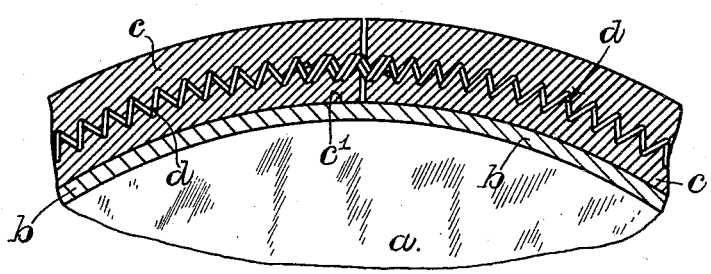
Figs. 1 and 2 are views, taken at right angles to each other, of a fragment of a brake drum provided with our improvement, according to one mode of embodiment.
Figure 2:
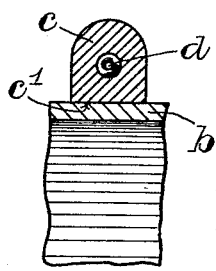
Figure 3:
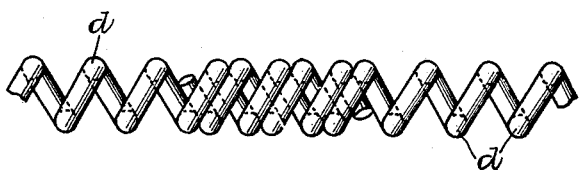
Fig. 3 is a view (drawn to an enlarged scale as compared with Figs. 1 and 2) showing the method of engaging or interlacing the ends of a coiled wire core.

Referring first to Figs. 1 to 3, inclusive, $a$ indicates a brake drum of a motor vehicle, around the outer periphery or rim $b$ whereof there is positioned a rope $c$ of rubber having a flat side $c'$ of substantial width and containing a helically coiled or spirally wound wire core $d$ the ends of which are engaged or interlaced in the manner shown. Said core $d$ is embedded in the rope during the course of manufacture.

Said helically coiled wire core $d$ maintains the rope continuously in tension on rim $b$, so that it will effectively absorb the drum vibrations when the brakes of the vehicle are applied, and so eliminate a squeaking noise.

As the flat side $c^1$ of said rope $c$ is in contact with the rim $b$ of drum $a$, ample bearing surface is provided, and so adhesive or external holding devices such as clips, or the like, are not required to maintain the rope in position.

Figure 4:
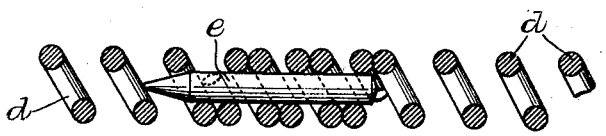
Fig. 4 illustrates the use of a pin positioned within engaged or interlaced end convolutions of the core.
Figure 5:
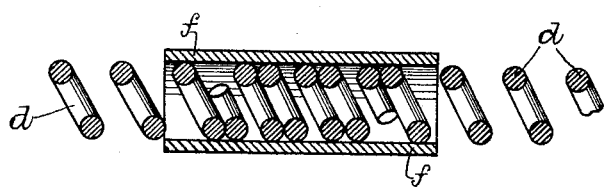
Fig. 5 depicts the use of a sleeve positioned around engaged ends of the core.

If desired, a pin $e$—see Fig. 4—may be positioned within the engaged or interlaced ends of core $d$; or a sleeve $f$—see Fig. 5—may be disposed around the engaged ends of the core.

It is to be clearly understood that we do not confine ourselves to the precise details of rope construction hereinbefore described, as, obviously, various alterations or modifications may be made without departing from the spirit and scope of the invention as defined by the claims.

What we claim as our invention and desire to secure by Letters Patent is:—

1. A brake drum of a motor vehicle provided on its periphery with a band of resilient material having a flat bearing surface of substantial width, a tensioned core disposed within said band and having its ends connected together, said core maintaining said band in tension on said brake drum.

2. For application to the periphery of a brake drum of a motor vehicle, a band of resilient material having a flat bearing surface of substantial width, a tensioned core disposed within said band and having its ends connected together, said core being adapted to maintain said band in tension on said brake drum.

In testimony whereof we affix our signatures.

ALFRED GEORGE BARRETT.
HUBERT HENRY BURTON.